United States Patent
Meca Martinez et al.

(10) Patent No.: US 11,643,145 B2
(45) Date of Patent: May 9, 2023

(54) BODY SIDE STRUCTURAL FRAME OF A VEHICLE

(71) Applicants: Autotech Engineering S.L., Amorebieta-Etxano (ES); Gestamp West Virginia, LLC, Wilmington, DE (US); Gestamp Mason, LLC, Wilmington, DE (US)

(72) Inventors: Marti Meca Martinez, Santpedor (ES); Xavier Valencia Carrio, Manresa (ES)

(73) Assignee: AUTOTECH ENGINEERING S.L., Vizcaya (ES)

( * ) Notice: Subject to any disclaimer, the term of this patent is extended or adjusted under 35 U.S.C. 154(b) by 0 days.

(21) Appl. No.: 17/068,128

(22) PCT Filed: Jun. 25, 2019

(86) PCT No.: PCT/EP2019/066846
§ 371 (c)(1),
(2) Date: Oct. 12, 2020

(87) PCT Pub. No.: WO2020/002335
PCT Pub. Date: Jan. 2, 2020

(65) Prior Publication Data
US 2021/0221439 A1 Jul. 22, 2021

(30) Foreign Application Priority Data
Jun. 25, 2018 (EP) ..................... 18382467

(51) Int. Cl.
*B62D 25/02* (2006.01)
*B62D 25/04* (2006.01)
(Continued)

(52) U.S. Cl.
CPC .......... *B62D 25/02* (2013.01); *B23K 26/0006* (2013.01); *B62D 25/025* (2013.01);
(Continued)

(58) Field of Classification Search
CPC ...... B62D 25/02; B62D 25/025; B62D 25/04; B62D 27/023
(Continued)

(56) References Cited

U.S. PATENT DOCUMENTS 3,159,419 A * 12/1964 Kerby ................ B62D 25/02
296/29
5,042,872 A * 8/1991 Yoshii ................ B62D 25/04
296/203.02
(Continued)

FOREIGN PATENT DOCUMENTS

CN 102198843 B 2/2013
CN 204197037 U 3/2015
(Continued)

OTHER PUBLICATIONS

International Search Report for International Application No. PCT/EP2019/066846, dated Sep. 6, 2019 (3 pages).
(Continued)

*Primary Examiner* — Dennis H Pedder
(74) *Attorney, Agent, or Firm* — Finnegan, Henderson, Farabow, Garrett & Dunner, LLP

(57) ABSTRACT

A method for manufacturing a unitary body side structural frame for a vehicle is provided. The method comprises providing a plurality of blanks, joining the blanks to each other to form a composite blank wherein joining the blanks includes forming one or more overlapping regions formed by partially overlapping two blanks and deforming the composite blank to form the unitary body side structural frame. A unitary body side structural frame as obtained by any of the methods herein described is also provided.

19 Claims, 7 Drawing Sheets

(51) Int. Cl.
　　*B62D 27/02*　　(2006.01)
　　*B23K 26/00*　　(2014.01)
　　*B62D 65/02*　　(2006.01)

(52) U.S. Cl.
　　CPC ............. *B62D 25/04* (2013.01); *B62D 27/02* (2013.01); *B62D 27/023* (2013.01); *B62D 65/02* (2013.01)

(58) Field of Classification Search
　　USPC ..................................... 296/193.06, 209, 29
　　See application file for complete search history.

(56) References Cited

U.S. PATENT DOCUMENTS

| | | | | |
|---|---|---|---|---|
| 8,720,984 | B2 * | 5/2014 | Kurogi | ................ B62D 25/025 296/205 |
| 2006/0097549 | A1 | 5/2006 | Fischer et al. | |
| 2010/0259072 | A1 | 10/2010 | Mizohata | |
| 2014/0239672 | A1 | 8/2014 | Yajima et al. | |

FOREIGN PATENT DOCUMENTS

| | | |
|---|---|---|
| DE | 102016124931 A1 | 6/2018 |
| EP | 2289770 A1 | 3/2011 |
| JP | H08243770 A | 9/1996 |
| JP | 2003127901 A | 5/2003 |
| WO | WO 2008/024042 A1 | 2/2008 |

OTHER PUBLICATIONS

Written Opinion of the International Searching Authority for International Application No. PCT/EP2019/066846, dated Sep. 6, 2019 (10 pages).

Office Action in Indian Patent Application No. 202037054832, dated Jan. 2, 2023 (7 pages).

Office Action and Search Report for Russian Patent Application No. 2021110867/11, dated Nov. 30, 2022 (10 pages).

Office Action and Search Report for Chinese Application No. 2019800519461, dated Sep. 22, 2022 (17 pages).

* cited by examiner

Prior Art

BODY SIDE STRUCTURAL FRAME OF A VEHICLE

This application is a national stage filing under 35 U.S.C. § 371 of International Application No. PCT/EP2019/066846, filed on Jun. 25, 2019, which claims priority of European Patent Application No. 18382467.1, filed on Jun. 25, 2018. The contents of these applications are each incorporated herein by reference.

The present application claims the benefit and priority of EP 18 382 467.1 filed on Jun. 25, 2018.

The present disclosure relates to body side structural frames for vehicles and methods of manufacturing body side structural frames for vehicles.

BACKGROUND

Vehicles such as cars incorporate a structural skeleton designed to withstand all loads that the vehicle may be subjected to during its lifetime. The structural skeleton is further designed to withstand and absorb impacts, in case of e.g. collisions with other cars or obstacles.

The structural skeleton of a vehicle, e.g. a car, in this sense may include e.g. bumpers, pillars (A-pillar, B-pillar, C-pillar, D-pillar), side impact beams, rockers or sills, hinge pillars and shock absorbers. A body side structural frame generally comprises a rocker panel, a hinge pillar, an A-pillar and a B-pillar. The body side structural frame may further comprise a C-pillar and a D-pillar.

In some examples, the body side structural frame may be formed by connecting multiple structural parts around a door. For example, by connecting the lower part of a previously formed B-pillar to a previously formed rocker and its upper part to a previously formed A-pillar and/or C-pillar; and the lower part of a previously formed hinge pillar to the rocker and its upper part to the A-pillar and/or C-pillar.

Such structural members may be formed by one or more plates joined to each other. For instance, a B-pillar may be formed by a central reinforcement B-pillar, an inner plate and in some examples an outer plate. The central reinforcement, the inner plate and the outer plate may be joined at their side flanges. The B-pillar, A-pillar, C-pillar, and other structural members may be supplied, e.g. by a single or different suppliers, to the vehicle manufacturer for joining them to form the body side structural frame.

In other examples, the body side structural frame may be made as a unitary structure and then be supplied to the vehicle manufacturer. According to this aspect, the body side structural frame may be formed by joining different blanks, e.g. by welding, for forming a composite blank and then shaping the composite blank, e.g. by hot forming or cold forming.

An example of a unitary body side structural frame of this type and a method for manufacturing thereof may be found in US 2006/0097549 A1. This document describes a side panel for a motor vehicle that includes a bottom sill member, a roof panel portion, and a plurality of pillars extending between the sill member and the roof panel portion. The sill member of this document forms with the pillars and the roof panel portion a single-piece structure from a sheet metal blank made of high-strength steel and has at least one region which is partly hardened and subject to increased load in the event of a crash of the motor vehicle.

Welding different blanks to form a composite blank and then shaping this composite blank is commonly called as Tailor Welded Blank (TWB). Blanks of different thicknesses, size, material or properties may be joined to form the composite blank for minimizing the weight of components while respecting structural requirements. These blanks are welded "edge to edge" ("butt-joining").

These so-called tailored blanks are generally designed to be hot stamped and afterwards be manufactured to form automotive parts, e.g. body side structural frame. Otherwise, such tailored blanks may also be designed to be cold formed. Hot Forming Die Quenching (HFDQ) uses boron steel sheets to create stamped components with Ultra High Strength Steel (UHSS) properties, with tensile strengths of at least 1.000 MPa, preferably approximately 1.500 MPa or up to 2.000 MPa or more.

An example of steel used in hot-stamping processes is 22MnB5 steel. 22MnB5 steel is supplied in a ferritic-perlitic phase. The mechanical properties are related to this structure. After heating, the blank is hot formed, and may then subsequently be quenched. This process is known as press-hardening. With such a process, a predominantly martensite microstructure may be created. As a result, ultimate tensile strength and yield strength increase noticeably.

Usibor® 1500P is an example of a 22MnB5 steel. The composition of Usibor® is summarized below in weight percentages (rest is iron (Fe) and unavoidable impurities):

| C | Si | Mn | P | S | Cr | Ti | B | N |
|---|---|---|---|---|---|---|---|---|
| 0.24 | 0.27 | 1.14 | 0.015 | 0.001 | 0.17 | 0.036 | 0.003 | 0.004 |

Usibor® 1500P may have a yield strength of e.g. 1.100 MPa, and an ultimate tensile strength of 1.500 MPa.

Usibor® 2000 is another boron steel with even higher strength. The yield strength of Usibor® 2000 may be 1.400 MPa or more, and the ultimate tensile strength may be above 1.800 MPa. A composition of Usibor® 2000 includes a maximum of 0.37% of carbon, a maximum of manganese of 1.4%, a maximum of 0.7% of silicon and a maximum of 0.005% of boron by weight.

Various other steel compositions of UHSS may also be used in the automotive industry. Particularly, the steel compositions described in EP2735620A1 may be considered suitable. Specific reference may be had to table 1 and paragraphs 0016-0021 of EP2735620A1, and to the considerations of paragraphs 0067-0079.

In some examples, the UHSS blanks may contain approximately 0.22% of carbon, 1.2% of silicon, and 2.2% of manganese by weight.

In some other examples, the UHSS blanks may contain 0.17-0.23% of carbon, a maximum of 2.5% of manganese, a maximum of 0.5% of silicon and 0.002-0.005% of boron by weight.

Another material used in hot stamping is Ductibor® 500. Ductibor® 500 is a steel material with much higher ductility and these can be effective for absorbing energy during an impact. The yield strength of Ductibor® 500 may be 400 MPa or more, and the ultimate tensile strength of 550 MPa or more.

The composition of Ductibor® 500 includes a maximum of 0.1% carbon, a maximum of 1.3% of manganese, a maximum of 0.5% silicon and a maximum of 0.001% of boron.

Ductibor® 1000 is another material used in hot stamping for increasing the elongation if compared to Usibor® 1500 and Usibor® 2000. The yield strength of Ductibor® 1000 may be 800 MPa or more, and the ultimate tensile strength of 1000 MPa or more. The composition of Ductibor® 1000 includes a maximum of 0.12% carbon, a maximum of 2% of manganese, a maximum of 0.75% silicon and a maximum of 0.005% of boron.

In order to avoid the decarburization and the scale formation during the forming process and to prevent corrosion and oxidation damage, steel of any of these compositions (e.g. 22MnB5 steel such as e.g. Usibor® and the others compositions mentioned or referred to before) is presented with a coating. This coating may be, e.g. aluminum-silicon (AlSi) coating or a coating mainly comprising zinc or a zinc alloy.

However, an aluminum-silicon coating has a significant downside related to its weld behavior. If blanks with aluminum-silicon coating are welded to form a tailor welded blank (TWB) without any further measures, aluminum of the coating may enter into the weld area and this can cause an important reduction of the mechanical properties of the resulting component and increase the possibility of a fracture in the weld zone.

In order to overcome this problem, it is known to remove, e.g. by laser ablation, a part of the coating in an area close to the welding zone. This method has the disadvantage that an additional step is needed for the production of the (tailored or composite) blanks and components and that in spite of the repetitive nature of the process this additional step requires a complex quality process with an elevated number of parts which are to be scrapped. This entails an increase of the cost of the welding step and limits the competitiveness of the technology in the industry.

Recently, other methods for avoiding the step of ablation of the coating have been developed. However, such methods require the use of additional powders or wires for counteracting the presence of the aluminum throughout the welding zone.

After forming the unitary body side structural frame, the unitary body side structural frame may be joined, e.g. welded, to the remaining parts of the structural skeleton of the vehicle, e.g. the inner plates of at least one of the A-pillar, B-pillar, C-pillar, hinge pillar and rocker. For example, the lower part of the unitary body side structural frame may be connected to the lower flange of the inner plate of the rocker and the upper part of the unitary body side structural frame may be connected to the upper flange of the inner plate of the A-pillar and/or of the C-pillar. The unitary body side structural frame formed in this manner may thus correspond to an "outer" panel, which may be complemented by an inner plate of an A-pillar, an inner plate of a B-pillar, an inner plate of a C-pillar, an inner plate of a hinge pillar and/or an inner plate of a rocker.

However, with this method, some sections of the A-pillar are not completely closed. The lower flange of the inner panel of the A-pillar and the unitary body side structural frame do not fit together along its whole length, i.e. there is a gap in some sections of the A-pillar. This may happen in the area of the A-pillar located substantially behind the B-pillar, in particular behind the central part of the B-pillar, i.e. in the area which corresponds to the U-shape section of the B-pillar. Similarly, the upper flange of the inner panel of the rocker and the body side structural frame are not in contact along the whole length of the rocker. This may occur in the area of the rocker located substantially behind the B-pillar and/or the hinge pillar, and therefore some sections of the rocker may also not be completely closed.

According to these aspects, there are some sections of the A-pillar and/or the rocker which are not completely closed, i.e. they do not form a closed section with their respective inner plate. Such sections may therefore have less strength when compared to solutions wherein the inner and the outer panel are welded through both the upper and the lower flanges along its whole length, i.e. wherein the pillars and the rocker are first deformed and then assembled to the remaining parts of the structural skeleton of the vehicle. Such a section with less strength may lead to a reduction of the structural behavior of the vehicle in the event of a crash. However, in order to ensure a good functional behavior of the side structural frame with respect to the door, and due to the characteristics of the geometric environment of the body side structural frame, it may be difficult to provide completely closed sections between the side structural frame and the inner plate (or plates) along the whole part and at the same time guaranteeing, for example, an appropriate position of the rubber seals of the body side structural frame.

The present disclosure provides examples of systems and methods that at least partially resolve some of the aforementioned disadvantages.

SUMMARY

In a first aspect, a method for manufacturing a unitary body side structural frame of a vehicle is provided. The method comprises providing a plurality of blanks, joining the blanks to each other to form a composite blank, wherein joining the blanks includes forming one or more overlapping regions formed by partially overlapping at least two blanks, deforming the composite blank to form the unitary body side structural frame, and wherein the unitary body side structural frame includes a lower beam portion and an upper beam portion, a front pillar portion connecting the lower beam portion to the upper beam portion, and a rear pillar portion connecting the lower beam portion to the upper beam portion.

According to this aspect, the thickness of some areas of the unitary body side structural frame is increased and therefore the strength of the unitary body side structural frame may also be increased. The increase of thickness in the one or more overlapping regions may reduce the overall weight of the unitary body side structural frame and the number of welding lines if compared to solutions wherein the whole thickness of one of the blanks is increased, since the overlap may be more precisely arranged in the required areas.

In this disclosure, partially overlapping two blanks means that only a portion of the two blanks overlap.

The lower beam portion may be a rocker portion. The upper beam portion may extend parallel to the roof of the vehicle. The front and the rear pillar portions may extend substantially vertically from the lower beam portion to the upper beam portion. The unitary body side structural frame may therefore define the door openings of the front door opening and/or of the rear door opening and/or a door opening including both the rear and the front door opening. Such a unitary body side structural frame may also be called a "one-piece door ring" or "unitary door ring".

In this disclosure, the rocker, the A-pillar, the B-pillar, the C-pillar and the hinge pillar should be understood as follows. A rocker or a sill is the component arranged in substantially horizontal direction which extends below the door opening(s) from the rear to the front part of a vehicle. A B-pillar is the vertically arranged component which extends from the floor to the roof of a vehicle. B-pillars are arranged in the central area of the vehicle and generally separate the front door opening and the rear door opening. A hinge pillar is a vertical body which substantially extends from the floor to the engine hood or the windscreen of a vehicle. Hinges of the front doors are commonly mounted on the hinge pillars. An A-pillar is the arcuate body that extends substantially parallel to a portion of the roof panel and to a portion of the front windscreen in the upper area of the door opening. The A-pillar extends from the upper part of the B-pillar to the upper part of the hinge pillar. In some configurations the A-pillar may extend beyond the B-pillar. A C-pillar is the structure behind the rear door of the vehicle which extends from the rocker portion upwards. In some examples, the C-pillar may extend from the rocker in a substantially vertical direction to the A-pillar (when the A-pillar extends beyond the B-pillar). In other examples, the C-pillar may comprise one substantially vertical part and an arcuate part that extend substantially parallel to a portion of the roof panel and to the upper area of the rear door opening to meet the B-pillar.

In some examples, the B-pillar, the A-pillar, the hinge pillar and the rocker may define a door frame. A unitary body side structural frame for a front door opening may therefore be formed.

In other examples, the unitary body side structural frame may be formed by connecting the lower part of a B-pillar to a rocker, its upper part to the upper part of a C-pillar and the lower part of the C-pillar to the rocker, so that a frame for a rear door opening may be formed.

In further examples, a unitary body side structural frame may enclose both the front and the rear door openings of a vehicle. In these examples, a rocker may be connected to a hinge pillar and to a C-pillar, whereas an A-pillar may connect the hinge pillar to the C-pillar. In some of these examples, the unitary body side structural frame may further comprise a B-pillar.

In all these examples, the unitary body side structural frame may be an outer frame. The unitary outer body side structural frame may therefore be joined to the remaining parts of the structure of the vehicle. Alternatively, the unitary body side structural frame may be an inner frame. Such a unitary inner frame may be joined to an outer frame.

When a body side structural frame is formed as a unitary structure, the boundaries between different pillars are less clear, precisely because it is a single structure. Therefore, reference is made herein to B-pillar "portions", A-pillar "portions", C-pillar "portions", etc. to denote portions of the unitary structure that might be regarded as forming the B-pillar, A-pillar, C-pillar, etc.

A transition between a beam portion and a pillar portion is the area wherein a pillar portions meets a beam portion, or in other words, the area changing from a substantially horizontally arranged body to a substantially vertical body.

Consequently, a transition between the B-pillar portion and the rocker portion is the area wherein the B-pillar portion meets the rocker portion, i.e. the area changing from a substantially horizontally arranged body to a substantially vertical body. A transition between the A-pillar and the B-pillar portions, a transition between the A-pillar and the hinge pillar portions and a transition between the hinge pillar and the rocker portions may similarly be defined. Analogously, a transition between the C-pillar and the A-pillar portions, a transition between the C-pillar and the B-pillar portions and a transition between the C-pillar and the rocker portions may also be defined.

The one or more overlapping regions may be arranged to counteract the reduction of material and therefore of strength that may occur in some sections of the unitary side body structural frame when compared to solutions wherein the structural components are first formed and then joined to form the body side structural frame.

In some examples, at least one of the overlapping region(s) may substantially correspond to a transition between a beam portion, e.g. a lower or an upper beam portion, and a pillar portion, e.g. the front or the rear pillar portion of the unitary structural frame. This is to say that one overlapping region may correspond to a transition between the rear pillar portion, e.g. a B-pillar portion or a C-pillar, and a lower beam portion, e.g. a rocker portion; or to a transition between the rear pillar portion and the upper beam portion; or to a transition between the front pillar portion, e.g. a hinge pillar or a B-pillar and the lower beam portion or between the front pillar portion and the upper beam portion.

Alternatively, or additionally, the overlap may be arranged in locations wherein high loads are expected. For example, the overlap may be arranged within a beam portion and/or a pillar portion. In some of these examples, at least one of the overlapping regions may be arranged within the upper beam portion, e.g. within the A-pillar portion or within the C-pillar portion.

In some examples, joining the blanks to each other may comprise welding the blanks to each other in an overlapping region. By joining the blanks to each other in an overlapping region it may not be necessary to remove part of the coating in the area close to the welding zone or to use powder or wire materials. Consequently, the efficiency of the manufacturing process may be improved and costs may thus be reduced. Optionally, the welding of these blanks may comprise spot welding. In other examples, alternative welding techniques may be used e.g. remote laser welding. In further examples, the blanks may be joined by other suitable methods, e.g. by glue.

In some examples, the unitary body side structural frame may be a front frame. In these examples, the lower beam portion may comprise a rocker portion, the upper beam portion may comprise an A-pillar portion, the front pillar portion may comprise a hinge pillar portion and the rear pillar portion may comprise a B-pillar portion.

The one or more overlapping regions may be arranged in a region of the unitary side structural frame subjected to high loads in an event of a lateral crash, e.g. in a transition between the B-pillar to the rocker and/or in a transition between the B-pillar to the A-pillar.

In some of these examples, one of the overlapping regions may substantially correspond to a transition between the rocker portion and the B-pillar portion, i.e. in the area changing from a substantially horizontal arrangement to a substantially vertical arrangement. In this way, a loss of strength caused by the gap formed between the inner plate of the rocker and the bottom section of the U-shape section of the B-pillar, may be compensated by the increase of thickness provided by the overlapping region. Therefore, the portion of the unitary body side structural frame extending from the rocker portion to the B-pillar portion is reinforced.

Alternatively, or additionally, one of the overlapping regions may substantially correspond to a transition between the B-pillar portion and the A-pillar portion. As a result, the portion of the unitary body side structural frame extending from the B-pillar portion to the A-pillar portion is reinforced.

In some examples, one of the overlapping regions may substantially correspond to a transition between the A-pillar portion and the hinge pillar portion. Such an overlapping region may provide an additional stiffness to the structural frame, in particular in a portion extending from the hinge portion to the A-pillar portion.

One of the overlapping regions may also substantially correspond to a transition between the rocker portion and the hinge portion.

Additionally, or alternatively, one of the overlapping regions may be arranged within the A-pillar portion.

The unitary body side structural frame may comprise several overlapping regions. For example, the B-pillar portion may comprise one overlapping region arranged on its lower part, i.e. in a transition between the rocker portion and the B-pillar portion, and another overlapping region arranged on its upper part, i.e. in a transition between the B-pillar and the A-pillar. The stiffness of the B-pillar portion, and consequently of the whole unitary body side structural frame, may therefore be increased.

In some other examples, the unitary body side structural frame may be a rear frame. In these examples, the front pillar portion comprises a B-pillar portion, the lower beam portion may comprise a rocker portion, the upper beam portion and the rear pillar portion may comprise a C-pillar portion extending from the rocker portion to the B-pillar portion.

In some of these examples, one of the overlapping regions may substantially correspond to the transition between the rocker portion and the B-pillar portion.

Alternatively, or additionally, one of the overlapping regions may substantially correspond to a transition between the B-pillar portion and the C-pillar portion.

In further examples, one of the overlapping regions may also substantially correspond to a transition between the C-pillar portion and the rocker portion.

In some other examples, the unitary body side structural frame may be a frame surrounding a single opening for both the front and the rear door of a vehicle. In these examples, the lower beam portion may comprise a rocker portion, the front pillar portion may comprise a hinge pillar portion, the rear pillar portion may comprise a C-pillar portion and the upper beam portion may comprise an A-pillar portion. The A-pillar portion may therefore extend from the hinge pillar portion to the C-pillar portion and the C-pillar portion may from the rocker portion to the A-pillar portion.

In this disclosure, a B-pillar-rocker overlapping region is to be understood as the overlapping region substantially corresponding to or provided in a transition between the B-pillar and the rocker portions; an A-pillar-B-pillar overlapping region as the overlapping region substantially corresponding to or provided in a transition between the A-pillar and the B-pillar portions; an A-pillar-hinge overlapping region as the overlapping region substantially corresponding to or provided in a transition between the A-pillar and the hinge pillar portions; a hinge-rocker overlapping region as the overlapping region substantially corresponding to or provided in a transition between the hinge pillar and rocker portions; a C-pillar-rocker overlapping region as the overlapping region substantially corresponding to or provided in a transition between the C-pillar and the rocker portions; a C-pillar-B-pillar overlapping region as the overlapping region substantially corresponding to or provided in a transition between the C-pillar and the B-pillar portions; a C-pillar-A-pillar overlapping region as the overlapping region substantially corresponding to or provided in a transition between the C-pillar and the A-pillar portions; a B-pillar overlapping region as the overlapping region arranged within the B-pillar portion, the A-pillar overlapping region as the overlapping region arranged within the A-pillar and the C-pillar overlapping region as the overlapping region arranged within the C-pillar.

In this disclosure, the length of an overlapping region is to be understood as the distance along the longitudinal axis of the beam portions which are part of the overlapping region, e.g. the A-pillar or the rocker portion. The longitudinal axis of the beam portions which are part of the overlapping region may correspond to the longitudinal axis of the vehicle, i.e. from the rear to the front par. The height of an overlapping region is substantially perpendicular to its length and is to be understood as the distance along the longitudinal axis of the front or the rear pillar portions which are part of the overlapping region, e.g. the longitudinal axis of the B-pillar or the hinge pillar or the C-pillar portion. The height of the overlapping regions may substantially correspond to the vertical axis of the vehicle, i.e. from the floor to the roof. The length and/or the height of an overlapping region may be variable along the overlapping region.

A B-pillar-rocker overlapping region may have a length (distance along the longitudinal axis of the rocker) between 20 and 600 mm, preferably, between 100 and 500 mm and more preferably between 200 and 400 mm and a height (distance along the longitudinal axis of the B-pillar) may be between 20 and 600 mm, preferably, between 100 and 500 mm and more preferably between 200 and 400 mm. A C-pillar-rocker overlapping region, a hinge-rocker overlapping region and an A-pillar-B-pillar overlapping region may have a similar size as the B-pillar-rocker overlapping region.

The length of an A-pillar-hinge overlapping region (distance along the longitudinal axis of the A-pillar portion) may be between 20 and 600 mm, preferably, between 40 and 400 mm and the height (distance along the longitudinal axis of the hinge pillar portion) may be between 20 and 600 mm, preferably, between 40 and 300 mm. The length of a C-pillar-A-pillar overlapping region (distance along the longitudinal axis of the A-pillar portion) and its height (distance along the longitudinal axis of the hinge pillar portion) may be similar to those of the A-pillar-hinge overlapping region.

An A-pillar overlapping region may have a length (distance along the longitudinal axis of the A-pillar portion) between 20 and 600 mm, preferably, between 40 and 400 mm and a height (distance perpendicular to the length) between 20 and 600 mm, preferably, between 40 and 400 mm.

A B-pillar overlapping region may have a height (distance along the longitudinal axis of the B-pillar portion) between 20 and 600 mm, preferably between 40 and 300 mm and a length (distance perpendicular to the longitudinal axis of the B-pillar portion) between 20 and 400 mm, preferably 40 and 200 mm.

A C-pillar overlapping region may have a length (distance along the longitudinal axis of the C-pillar portion) between 20 and 600 mm, preferably, between 40 and 300 mm and a height (distance perpendicular to the length) between 20 and 400 mm, preferably, between 40 and 200 mm.

The unitary body side structural frame is formed by joining the plurality of blanks. At least two blanks are joined to each other by one of the overlapping region. The unitary body side structural frame may therefore comprise at least two blanks, e.g. four blanks.

In some examples, the portions may include more than one blank. For example, the B-pillar portion may be formed by two or three blanks.

The unitary body side structural frame may comprise joints between a minimum of two blanks having an overlapping region. Joints with an overlapping region between two blanks may be welded by spot welding or other welding or joining technologies. Welding two blanks in an overlapping region to form a unitary body side structural frame may increase the productivity of the welding process. Dimensional gaps between blanks produced when blanks are not welded through an overlapping region, e.g. in a butt-jointed welding configuration, may thus be avoided. Accordingly, joints with an overlapping region may help to absorb different tolerances of the blanks.

In some examples, the unitary body side structural frame may comprise joints between two blanks with an overlapping region and other joints having an edge to edge configuration, e.g. square butt-joined.

In some examples, deforming the composite blank to form the unitary body side structural frame comprises hot forming the composite blank. At least some of the blanks may be made from ultra high strength steels (UHSS). Boron steel, e.g. 22MnB5, or other steel compositions mentioned or referred to before may be suitable UHSS. These blanks, e.g. boron steel blanks, may comprise an aluminum silicon coating or zinc coating.

In some examples, hot forming may comprise heating the composite blank above the austenitization temperature, cooling the composite blank to a temperature e.g. between 400° C. and 600° C. and then forming the composite blank to create the unitary body side structural frame. In some examples, forming may comprise two or more forming steps. These forming steps may comprise for example shaping, trimming or cutting and may be made in a single multi-stage press. Examples of forming comprising two or more forming steps may be seen in U.S. Pat. No. 9,492,859 B2 and WO 2016142367 A1.

Alternatively, the composite blank may be deformed by cold forming. High strength steels or ultra high strength steels may be used for forming the unitary body side structural frame by cold forming.

The plurality of blanks that form the composite may comprise different material and/or thicknesses. For example, blanks of Usibor® (e.g. Usibor® 1500 or Usibor® 2000) and blanks or parts of the blanks of Ductibor® (e.g. Ductibor® 500 or Ductibor® 1000) may be used. Using these types of materials in hot forming processes leads to a predominantly martensitic structure in the Usibor® parts and a predominantly ferritic-perlitic structure in the Ductibor® parts. According to these aspects, the properties of the unitary body side structural frame may be tailored.

In a further aspect, a unitary body side structural frame as obtained by a method according to any of the examples herein described is provided.

In some examples, the unitary body side structural frame may comprise areas with different tensile strength according to any of the examples herein described. In some of these examples, the areas with different tensile strength may have a different microstructure.

In some examples, at least one of the blanks may comprise areas with different tensile strengths. A blank may be composed of two different materials having different tensile strengths. The ductility of the areas with lower tensile strength is accordingly higher and therefore the energy absorption in a crash may be increased.

Alternatively, these areas with different tensile strength may have a different microstructure. Different microstructures may be created in a hot formed unitary body side structural frame. These different microstructures may be created by heating a composite blank above the austenitization temperature and then controlling the cooling of the composite blank during shaping the composite blank to form a body side structural frame. The cooling of different areas of the composite blank may be controlled by providing zones of the forming tool with heaters. Accordingly, the unitary body side structural frame comprises zones with a predominantly martensitic structure and zones comprising ferrite, perlite or bainite or a mixed of thereof. Alternatively, a different microstructure, may be created by partially heating, e.g. using a laser beam, a portion of the unitary body side structural frame which has been press-hardened to change the predominantly martensitic structure to a structure containing ferrite and/or perlite and/or bainite and/or tempered martensite and a mixed of thereof. The tensile strength of the predominantly martensitic structure may be above 1400 MPa, and preferably above 1500 MPa, while the areas with a lower strength may have a tensile strength below 1000 MPa, preferably below 800 MPa, e.g. between 800 MPa and 500 MPa.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
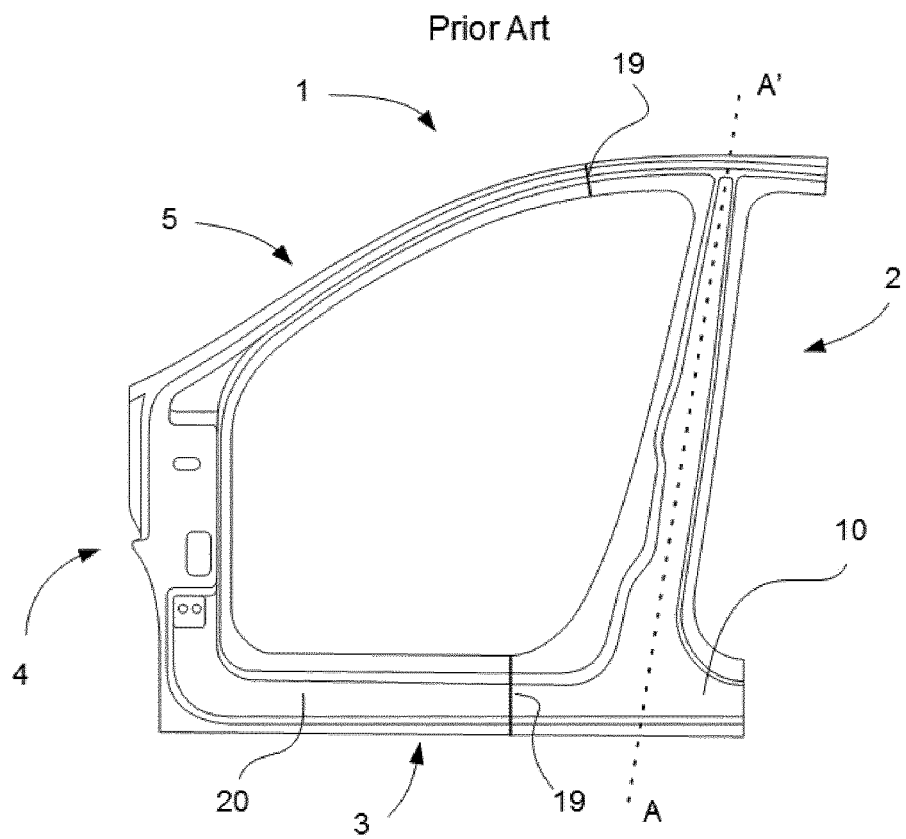
FIG. 1 shows an example of a unitary body side structural frame of a vehicle according to the prior art.

FIG. 1 shows an example of a unitary body side structural frame 1 of a vehicle according to the prior art. The body side structural frame 1 comprises a rocker portion 3, an A-pillar portion 5, a hinge pillar portion 4 connecting the rocker portion 3 to the A-pillar portion 5 and a B-pillar portion 2 connecting the rocker portion 3 to the A-pillar portion 5. The hinge pillar portion 4 is located in the frontal part of the vehicle whereas the B-pillar in the central part with respect to the longitudinal axis of the vehicle.

The body side structural frame 1 is made from two blanks, a first blank 10 and a second blank 20. The blanks are joined to each other by welding along the laser welding lines 19. The blanks are welded "edge to edge", e.g. square butt joining. Blanks are first welded to form a composite blank and then the composite blank is deformed to form the unitary body side structural frame 1. Therefore, the first blank 10 and the second blank 20 have been previously assembled and are then deformed at the same time in a combined forming process.

Although not visible in FIG. 1, it should be appreciated that the unitary body side structural frame 1 is joined to the remaining parts of the structural skeleton of the vehicle. In FIG. 1, the rocker portion 3 is joined to the inner plate of a rocker of the vehicle (not visible in FIG. 1) and the A-pillar portion 5 is joined to the inner plate of an A-pillar of the vehicle (not visible in FIG. 1).

Figure 2:
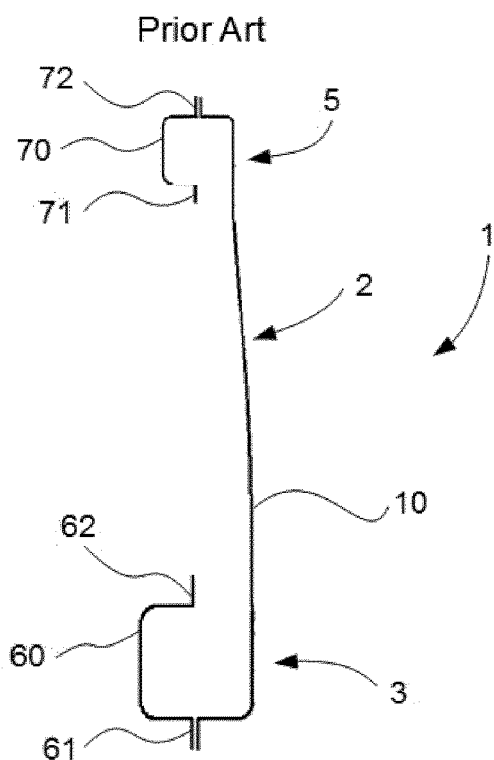
FIG. 2 schematically represents a sectional view along the line A-A' of the unitary body side structural frame of FIG. 1.

FIG. 2 schematically represents a sectional view along the line A-A' of the unitary body side structural frame 1 of FIG. 1 including the inner plates of the rocker and of the A-pillar. The unitary body side structural frame 1 is joined to an inner plate 70 of the A-pillar and to an inner plate 60 of the rocker.

The inner plate 70 of the A-pillar comprises a lower flange 71 and an upper flange 72. The unitary body side structural frame, in particular the A-pillar portion 5, is connected to the inner plate 70 of the A-pillar through the upper flange 72. As previously described, the lower flange 71 of the A-pillar does not completely fit with the A-pillar portion 5 of the body side structural frame 1, i.e. there is a gap between the lower flange 71 and the body side structural frame 1. Such a gap may represent a weak point in terms of structural behaviour in the event of a crash.

The inner plate 60 of the rocker comprises a lower flange 61 and an upper flange 62. The body side structural frame is connected to the inner plate 60 of the rocker through the lower flange 61. Similar to the connection of the inner plate 70 of the A-pillar to the A-pillar portion 5, the inner plate 60 of the rocker does not completely fit with the rocker portion 3 of the body side structural frame 1. This gap may also be a structurally weak point.

Blanks of the unitary body side structural frame of FIGS. 1 and 2 are welded edge to edge and consequently overlapping regions are not created.

Figure 3:
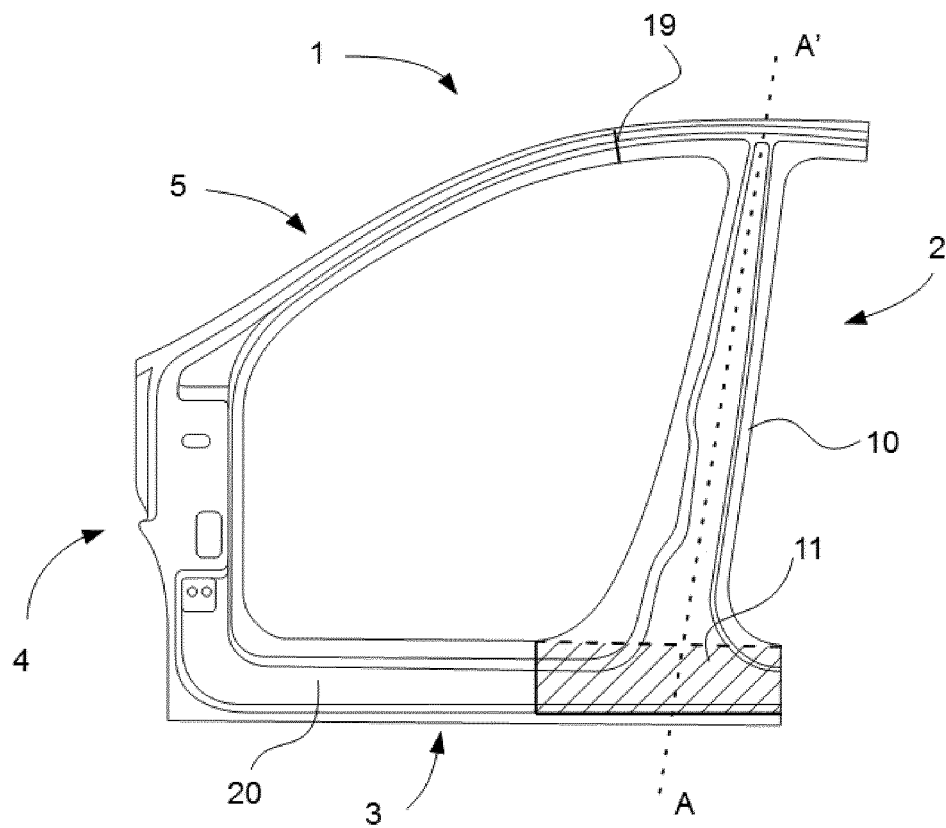
FIG. 3 shows an example of a unitary body side structural frame of a vehicle.

FIG. 3 shows an example of a unitary body side structural frame 1 for a vehicle. In this example, the body side structural frame 1 of FIG. 3 is a front frame. The body side structural frame has a unitary structure, wherein the lower beam portion comprises a rocker portion 3, the upper beam portion comprises an A-pillar portion 5, the front beam portion comprises a hinge pillar portion 4 connecting the rocker portion 3 to the A-pillar portion 5 and the rear beam portion comprises a B-pillar portion 2 connecting the rocker portion 3 to the A-pillar portion 5. The B-pillar portion may comprise a U-shaped section with two lateral flanges.

The unitary body side structural frame 1 of FIG. 3 is made from two blanks, a first blank 10 and a second blank 20 joined to each other forming a composite blank which is deformed to form the unitary body side structural frame 1. The first blank 10 and the second blank partially overlap in the overlapping region 11, i.e. only a portion of the first blank and a portion of the second blank overlap.

In the example of FIG. 3, the first blank 10 and the second blank 20 are spot welded through the overlapping region 11. In this specific example, the overlapping region 11 is located in the lower part of the first blank 10. The upper part of the first blank 10 may be laser welded to the second blank 20 through a laser welding line 19. Laser welding the upper part of the first blank 10 to the second blank 20 may involve the step of removing the coating of the blanks or using powder or wire to counteract the effect of the coating. Other methods to counteract the negative effect of the coating may be used in those joints without an overlap as for example oscillating a laser beam applied to the welding zone or applying a magnetic field in the welding zone to mix the coating and the base material of the blanks.

In this example, one blank, the first blank 10, may include at least a part of the B-pillar portion 2 and another blank may include the remaining portions of the body side structural frame, e.g. a second blank 20 may include at least a part of the rocker portion 3, of the hinge portion 4 and of the A-pillar portion 5. A first blank substantially corresponding to the B-pillar may thus have a substantially elongated shape. Such a shape may help to optimize the use of material in coils to form the blanks and to minimize scrap.

In this example, the overlapping region 11 may be substantially arranged in a transition between the rocker portion 3 and the B-pillar portion 2. This overlapping region may be called as a B-pillar-rocker overlapping region 11 is formed.

In further examples, one or more overlapping region may additionally or alternatively be arranged in other parts of the unitary body side structural frame.

Figure 4:
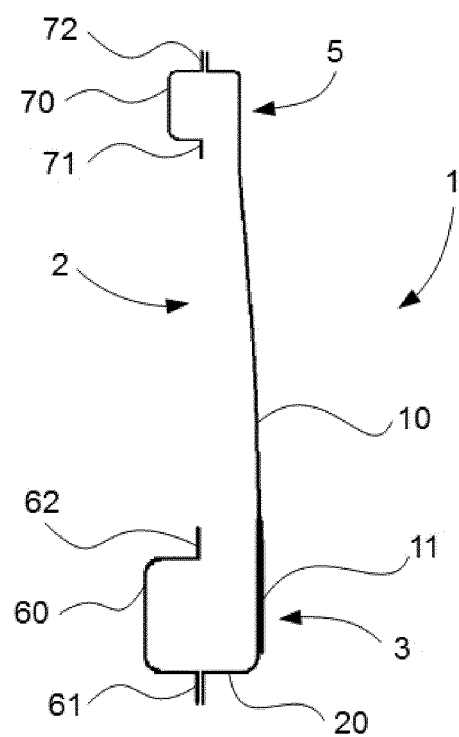
FIG. 4 schematically represents a sectional view along the line A-A' of the unitary body side structural frame of FIG. 3.

FIG. 4 schematically represents a sectional view along the line A-A' of the unitary body side structural frame 1 of FIG. 3. The body side structural frame 1 is joined to an inner plate 70 of the A-pillar and to an inner plate 60 of the rocker. The body side structural frame is connected to the inner plate 60 of the rocker through the lower flange 61. As the thickness of the body side structural frame in the overlapping region 11 is increased, the overlapping region 11 may provide enough stiffness to the unitary body side structural frame to at least counteract the negative structural effect of not completely fitting the inner plate 60 of the rocker and the rocker portion 3 of the body side structural frame 1.

Figure 5:
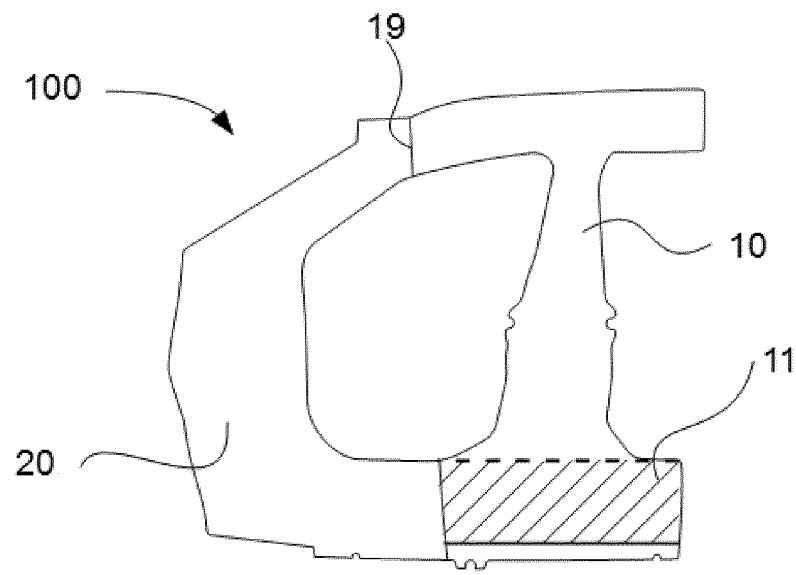
FIG. 5 shows a composite blank before being deformed to form the unitary body side structural frame of FIG. 3.

FIG. 5 shows a composite blank before being deformed to form the body side structural frame of FIG. 3. The composite blank 100 is made by joining two blanks, the first blank 10 to a second blank 20. The first blank 10 and the second blank 20 partially overlap in the overlapping region 11. In this example, the upper part of the first blank 10 is edge to edge laser welded to the second blank 20 through the welding line 19. Once the blanks are joined to each other the composite blank 100 is formed and then the composite blank is deformed to form the unitary body side structural frame as shown in FIG. 3.

Deforming may include hot forming, i.e. heating the composite blank in an oven, possibly above an austenization temperature, specifically above Ac3. After heating in the oven, the blank may be transferred to a press in which the blank is deformed to obtain the final shape of the body side structural frame. During and immediately after forming, quenching may be carried out. In particular, the quenching may include cooling above a critical cooling rate so that a martensitic microstructure is obtained. In some examples, quenching may be avoided in selected portions of the body side structural frame.

Figure 6A:
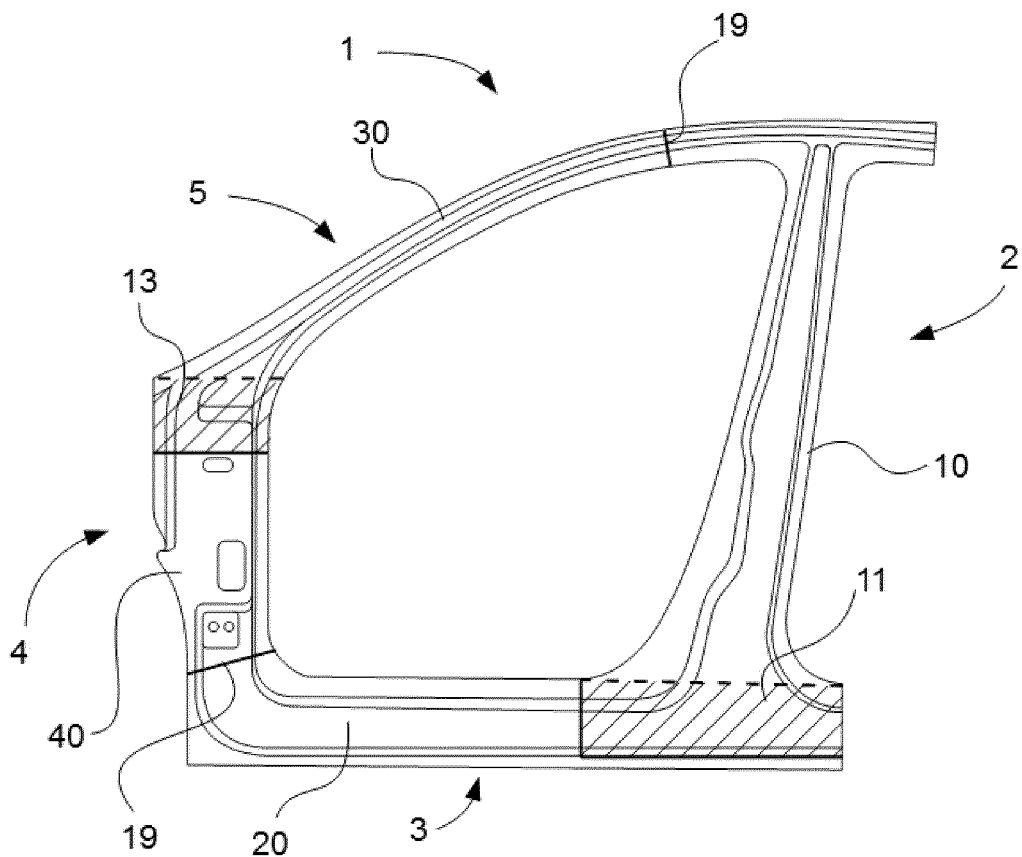
FIG. 6A shows another example of a unitary body side structural frame of a vehicle.

FIG. 6A shows another example of a unitary body side structural frame 1 of a vehicle. The unitary body side structural frame 1 of FIG. 6A is a front frame and is made from four blanks. Each of the blanks may include at least a part of one of the A-pillar portion 5, the B-pillar portion 2, the hinge pillar portion 4 and the rocker portion 3. For example, a first blank 10 may be joined to a second blank 20 and to a third blank 30, whereas a fourth blank 40 may be joined to the second blank 20 and to the third blank 30 on the opposite side. In FIG. 6A, the first blank 10 may include at least a part of or the complete the B-pillar portion 2, the second blank 20 may include at least a part of the rocker portion 3, the third blank 30 may include at least a part of the A-pillar portion and possibly the complete A-pillar portion and the fourth portion 40 may include at least a part of the hinge pillar portion 4.

In these examples, the unitary body side frame may comprise two or more overlapping regions. For example, one overlapping region 11, corresponds to or is provided in a transition between the rocker portion 3 to the B-pillar portion 2. This overlapping region may be called as a B-pillar-rocker overlapping region 11. The unitary body side structural frame may further comprise an A-pillar-hinge pillar overlapping region 13 corresponding to or provided in a transition between the A-pillar and the hinge pillar.

Blanks joined through the overlapping regions may be spot welded. Other blanks, i.e. blanks joined without overlapping regions between them, may be welded to each other along the welding lines 19.

The B-pillar-rocker overlapping region 11 may have a length (distance along the longitudinal axis of the rocker) similar to the width, i.e. from on lateral flange to the other one, of the B-pillar portion and a height (distance along the longitudinal axis of the B-pillar) similar to the height of the rocker portion 3, i.e. from the lower flange to the upper flange of the rocker portion. In other examples, the height of the B-pillar-rocker overlapping region 11 may be smaller than the height of the rocker portion. The A-pillar-hinge overlapping region 13 may have a length similar to the width of the hinge pillar portion.

In some examples, the area extending from the hinge pillar to the A-pillar may be subjected to high loads in an event of a crash. By the increase of thickness from the third overlapping region, the stiffness of this area is increased.

Figure 6B:
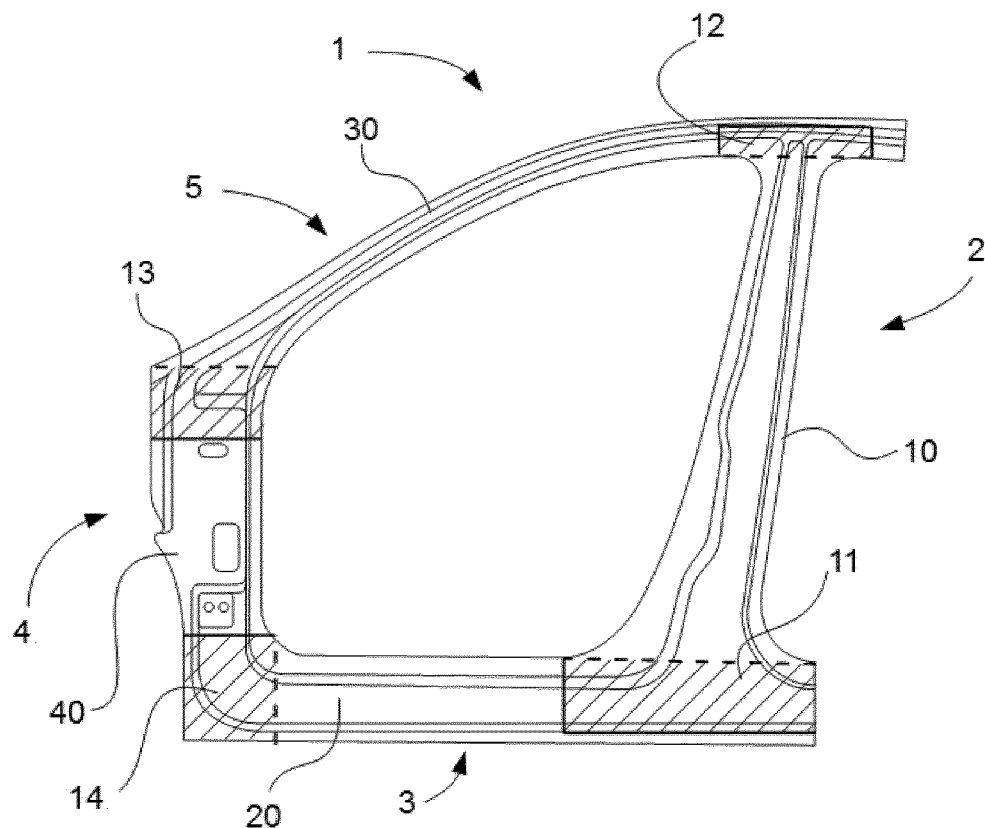
FIG. 6B shows another example of a unitary body side structural frame of a vehicle.

FIG. 6B shows another example of a unitary body side structural frame 1 of a vehicle similar to the example depicted in FIG. 6A. The body side structural frame 1 of FIG. 6B comprises a first blank 10 having a B-pillar portion 2 and is joined in a B-pillar-rocker overlapping region 11 to a second blank 20 and in an A-pillar-B-pillar overlapping region 12 to a third blank 30. In this figure, the second blank 20 comprises a rocker portion 3 and is also joined to a fourth blank 40 through a hinge-rocker overlapping region 14. The fourth blank 40, which may include a hinge portion 4, may also be joined to the third blank in an A-pillar-hinge overlapping region 13. In this example, the third blank 30 include a part of the A-pillar portion 5. In FIG. 6B, the unitary body side structural frame 1 is thus formed by four blanks.

In further examples, the unitary body side structural frame may be formed by additional blanks. These additional blanks may be joined between them or to any of the above-mentioned blanks by an overlapping region or by an edge-to-edge welding line.

Figure 7:
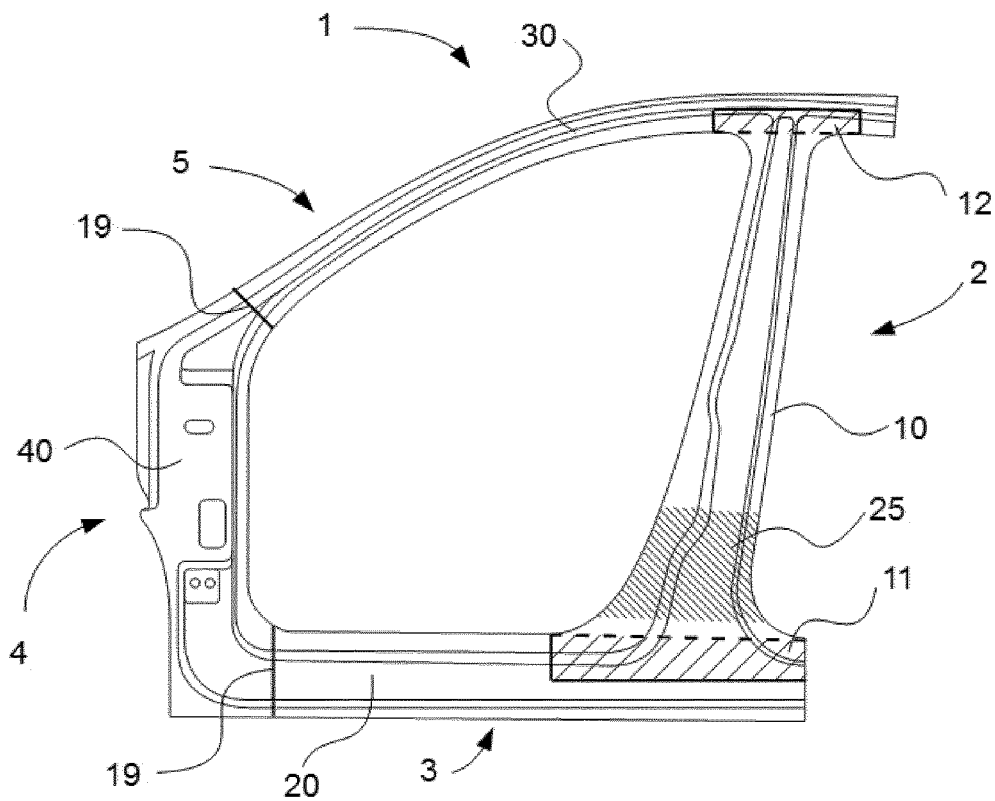
FIG. 7 shows another example of a unitary body side structural frame of a vehicle.

FIG. 7 shows another example of a unitary body side structural frame 1 of a vehicle similar to the example depicted in FIGS. 6A and 6B. In FIG. 7, the body side structural frame 1 comprises a B-pillar-rocker overlapping region 11, wherein a first blank 10 and a second blank 20 partially overlap, and an A-pillar-B-pillar overlapping region 12, wherein the a first blank 10 and a third blank 30 are partially overlapped.

In FIG. 7, the B-pillar-rocker overlapping region 11 has a length corresponding to the width of the B-pillar portion 2 in its lower part and a height corresponding to the half of the height of the rocker portion 3. According to this aspect, the first blank 10 does not completely cover the height of the rocker portion 3. Similarly, the A-pillar-B-pillar overlapping region 12 may have a length corresponding to the width of the B-pillar portion 2 in its higher part and a height corresponding to a half of the height of the A-pillar portion 5. In other examples, the shape of the overlapping regions may be adapted to the shape of the body side structural frame and/or to the structural behaviour of the vehicle.

In these examples, the fourth blank 4 is welded to the third 3 and to the second blank 5 along the welding lines 19. Alternatively, these joints may be made by partially overlapping these blanks according to any of the examples described herein.

In order to control the deformation of the unitary body side structural frame or increasing the energy absorbed by the body side structural frame in the event of a crash while the overall strength of the body side structural frame is at least maintained, the unitary body side structural frame may comprise areas with different mechanical properties.

The unitary body side structural frame 1 of FIG. 7 may have been deformed by hot forming and subsequently quenched. The unitary body side structural frame of FIG. 7 is made from fourth blanks of boron steel with an aluminum-silicon coating. After press-hardening, the body side structural frame has a predominant substantially martensitic microstructure with tensile strength higher than 1400 MPa. However, the first blank 10 of the body side structural frame comprises an area with a lower tensile strength 25. This area with lower tensile strength 25 has a different microstructure with respect to the martensitic structure. Such a lower strength area 25 may comprise ferrite and/or bainite and/or perlite and/or tempered martensite and/or a mixed of thereof. Accordingly, the tensile strength of the lower strength area may be lower than 1000 MPa. The ductility of this area is consequently increased and therefore the absorption of energy may be increased and the deformation of the body side structural frame may be more accurately controlled. The unitary body side structural frame may thus have areas with a tensile strength higher than 1400 MPa, i.e. hard zones, and areas with tensile strength lower than 1000 MPa, i.e. soft zones.

In FIG. 7, the lower strength area 25 is arranged on the lower portion of the first blank 10. The lower strength area 25 may be arranged just above the B-pillar-rocker overlapping region 11. According to this aspect, B-pillar-rocker overlapping region 11 may correspond to the lowest area of the B-pillar portion 2. As a result, the B-pillar-rocker overlapping region 11, i.e. the region wherein the first and the second blanks partially overlap, provides stiffness to the body side structural frame and the area with lower strength 25 helps to control the deformation of the B-pillar portion in such a way that the intrusion of this portion in a crash may be reduced.

Such areas with lower strength 25 may be formed by a differential cooling of these areas of the composite blank while it is pressed in a pressing tool during the hot forming die quenching process for forming the body side structural frame. Alternatively, such an area may be created by a differential heating during hot forming avoiding these areas to reach a temperature higher than the austenitization temperature. In further examples, this lower strength may be achieved by partially heating some areas of the unitary body side structural frame after press-hardening for modifying the microstructure in these areas.

In yet other examples, rather than modifying the microstructure to change the mechanical properties, e.g. tensile strength and elongation, the areas with lower strength may be formed from materials having different mechanical properties with respect to the remaining parts of the body side structural frame. For example, the lower strength area 25 may be made from Ductibor® and the remaining parts of the body side structural frame from Usibor®.

In other examples, the plurality of blanks may have different thickness. In further examples some of the blanks may be composed by parts having different thickness.

In any of the examples disclosed herein, the unitary body side structural frame may also incorporate a "patchwork", i.e. a local reinforcement provided on the composite blank.

It should be noted that these different strategies to improve the response of the unitary body side structural frame in an event of a crash may be combined in a body side structural frame and even in at least one blank.

Unitary body side structural frames according to other examples may comprise lower strength areas or areas to improve the frame in an event of a crash according to any of the examples described with respect to FIG. 7.

Figure 8A:
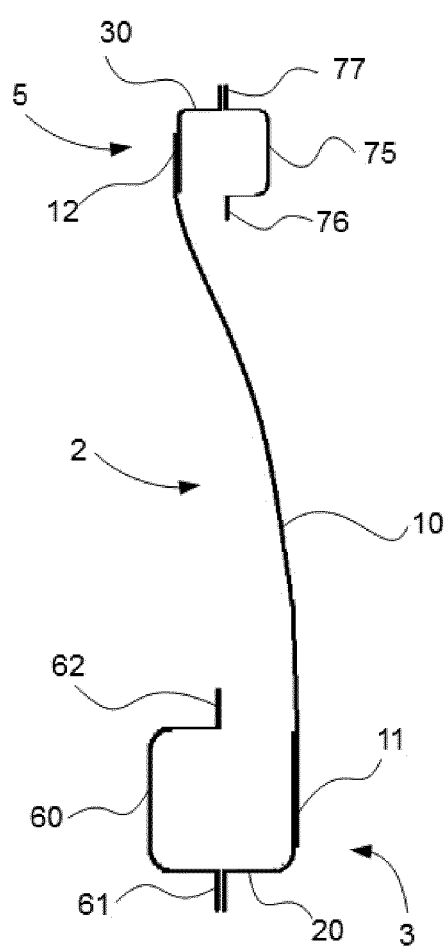
FIG. 8A—8B shows examples of unitary body side structural frames joined to an A-pillar plate and to a rocker plate.
Figure 8B:
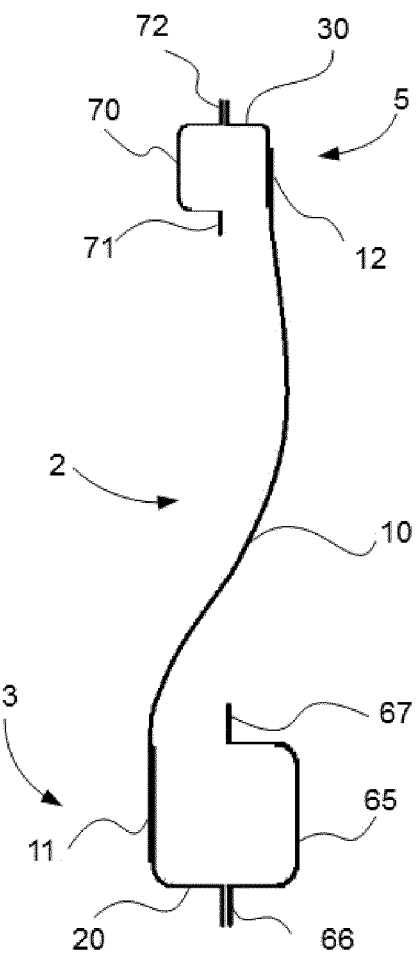

Although in the previous examples the unitary body side structural frame is joined to the lower flange of the inner plate of the rocker and to the upper flange of the inner plate of the A-pillar, the body side structural frame may alternatively be joined to outer plate of the rocker and/or of the outer plate of the A-pillar. In some cases, the skeleton of the vehicle before joining the body side structural frame may include an outer plate of the rocker or of the A-pillar, rather than an inner plate, e.g. for manufacturing purposes. FIG. 8A-8B shows examples of unitary body side structural frames joined to an A-pillar plate and to a rocker plate.

In FIG. 8A the lower part of the unitary body side structural frame 1 is joined to the lower flange of the inner plate of the rocker 60. In this example, the second blank 20 is joined to the lower flange 61 of the inner plate of the rocker 60 in a similar way that with respect to FIG. 4. The third blank 30 may be joined to the upper flange 77 of the outer plate 75 of the A-pillar.

On the contrary, in FIG. 8B the second blank 20 is joined to lower flange 66 of the outer plate of the rocker 65, while the third blank 30 is joined to the upper flange 72 of the inner plate of the A-pillar 70 in a similar way that with respect to FIG. 4.

Figure 9:
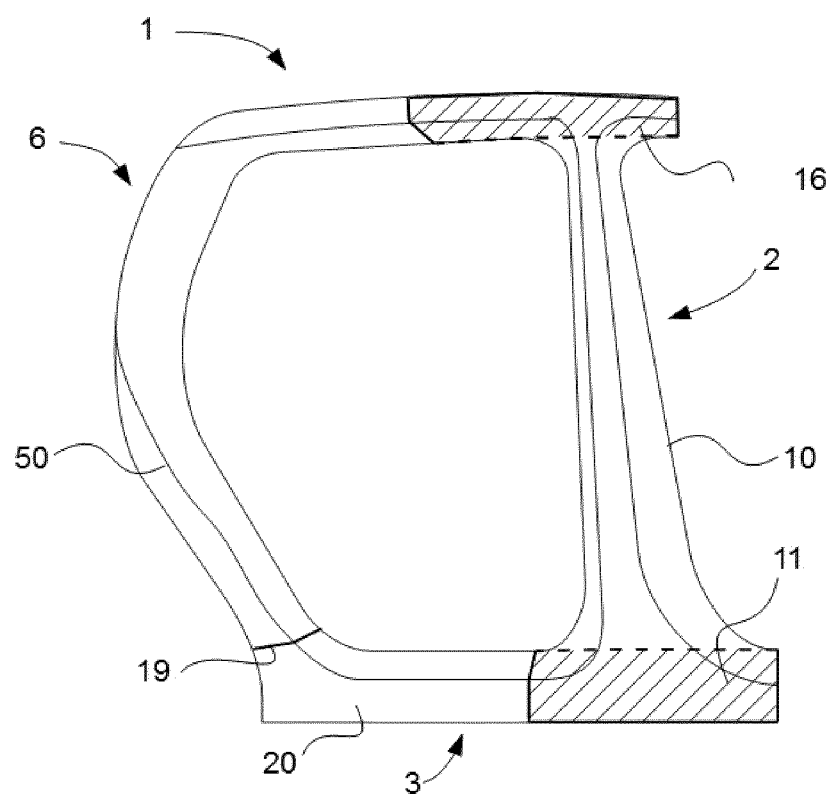
FIG. 9 shows another example of a unitary body side structural frame of a vehicle.

FIG. 9 shows another example of a unitary body side structural frame 1 of a vehicle, wherein the unitary body side structural frame is a rear frame. In this example, the lower beam portion may comprise a rocker portion 3, the front pillar portion may comprise a B-pillar portion 2 and the rear pillar portion and the upper beam portion may comprise a C-pillar portion 6 extending from the rocker portion 3 to the B-pillar portion 2.

The unitary body side structural frame 1 comprises one or more overlapping regions. In this figure the structural frame 1 comprises a B-pillar-rocker overlapping region 11 and a C-pillar-B-pillar overlapping region 16. The structural frame 1 of this figure comprises three blanks, one blank 10 including the B-pillar portion 2, another blank 20 including the rocker portion 3 and the other blank 50 including the C-pillar portion 6. In this example, blanks 10 and 50 partially overlap in the C-pillar-B-pillar overlapping region 16 and blanks 10 and 20 partially overlap in the B-pillar-rocker overlapping region 11. However, blanks 20 and 50 are joined to each other edge to edge through the welding line 19.

In other examples, the structural frame 1 may comprise only one of the B-pillar-rocker overlapping region 11 and the C-pillar-B-pillar overlapping region 16.

Alternatively, or additionally, one of the overlapping regions may substantially correspond to a transition between the C-pillar portion and the rocker portion, i.e. the structural frame may comprise a C-pillar-rocker overlapping region.

Figure 10:
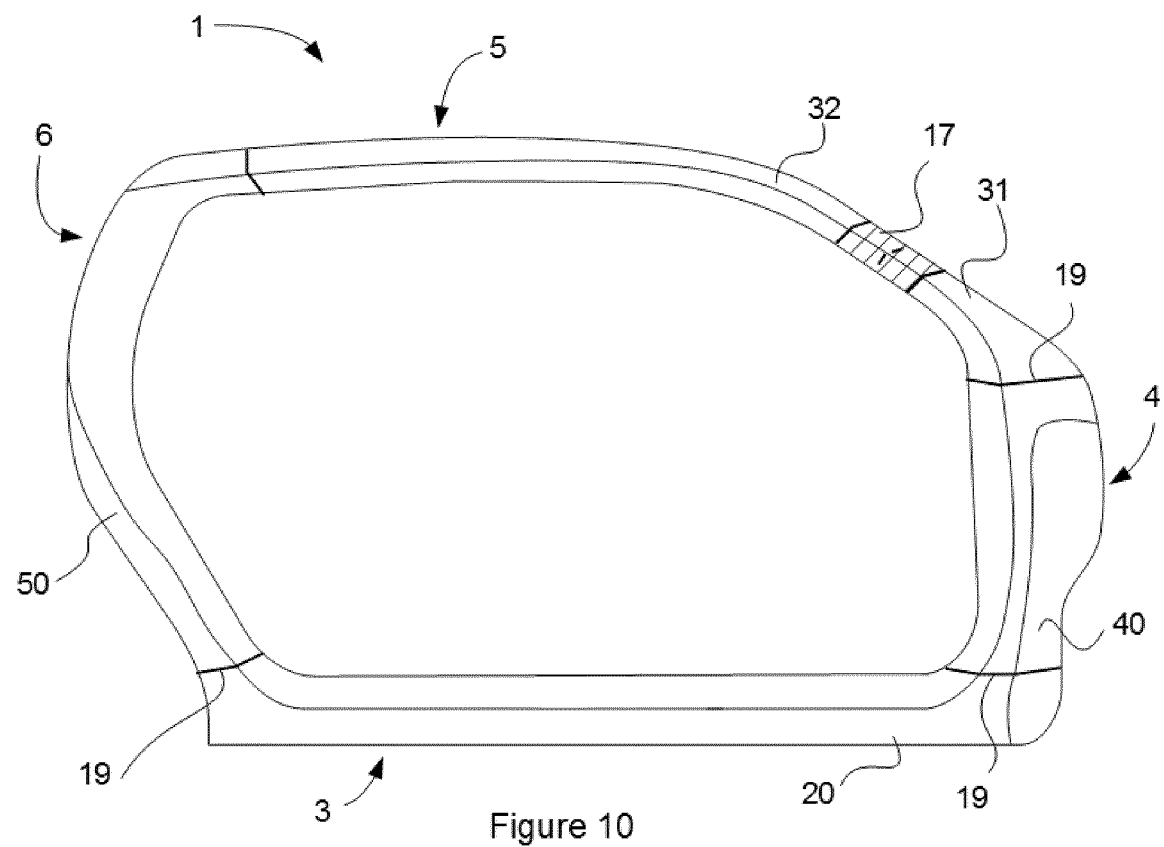
FIG. 10 shows another example of a unitary body side structural frame of a vehicle.

FIG. 10 shows another example of a unitary body side structural frame 1 of a vehicle, wherein the unitary body side structural frame encloses a single opening for the front and the rear door of a vehicle. In this example, the lower beam portion may comprise a rocker portion 3, the front pillar portion may comprise a hinge pillar portion 4, the rear pillar portion may comprise a C-pillar portion 6 and the upper beam portion may comprise an A-pillar portion 5. The A-pillar portion 5 may extend from the hinge portion 4 to the C-pillar portion 6 and the C-pillar portion 6 may extend from the rocker portion 3 to the A-pillar portion 6.

In this figure, the unitary body side structural frame 1 comprises one overlapping region 17 arranged within the A-pillar portion 2. A-pillar portion 2 may thus be formed by partially overlapping the blanks 31 and 32. Connections between other blanks may be made through the edge to edge welding line 19.

In other examples, the one or more overlapping regions may be arranged in other parts of the unitary body side structural frame 1.

In some examples, the structural frame 1 may comprise an A-pillar-hinge overlapping region which substantially corresponds to a transition between the A-pillar portion and the hinge pillar portion.

Alternatively, or additionally, one of the overlapping regions may substantially correspond to a transition between the C-pillar portion and the rocker portion, i.e. the structural frame may comprise a C-pillar-rocker overlapping region.

Alternatively, or additionally, one of the overlapping regions may substantially correspond to a transition between the hinge portion and the rocker portion, i.e. the structural frame may comprise a hinge-rocker overlapping region.

In these examples, the unitary body side structural frame 1 does not comprise a B-pillar portion. However, a B-pillar may be separately formed and joined to the unitary body side structural frame to form a "non-unitary" body side structural frame.

In a further aspect, a method for manufacturing a body side structural frame made from a B-pillar joined to a unitary body side structural frame is provided. The method comprises providing a unitary body side structural frame for enclosing both the front and the rear door openings without a B-pillar portion according to any of the examples herein described, providing a B-pillar and joining the B-pillar to the unitary front side structural frame. As a result, a "non-unitary" body side structural frame may be manufactured.

Figure 11:
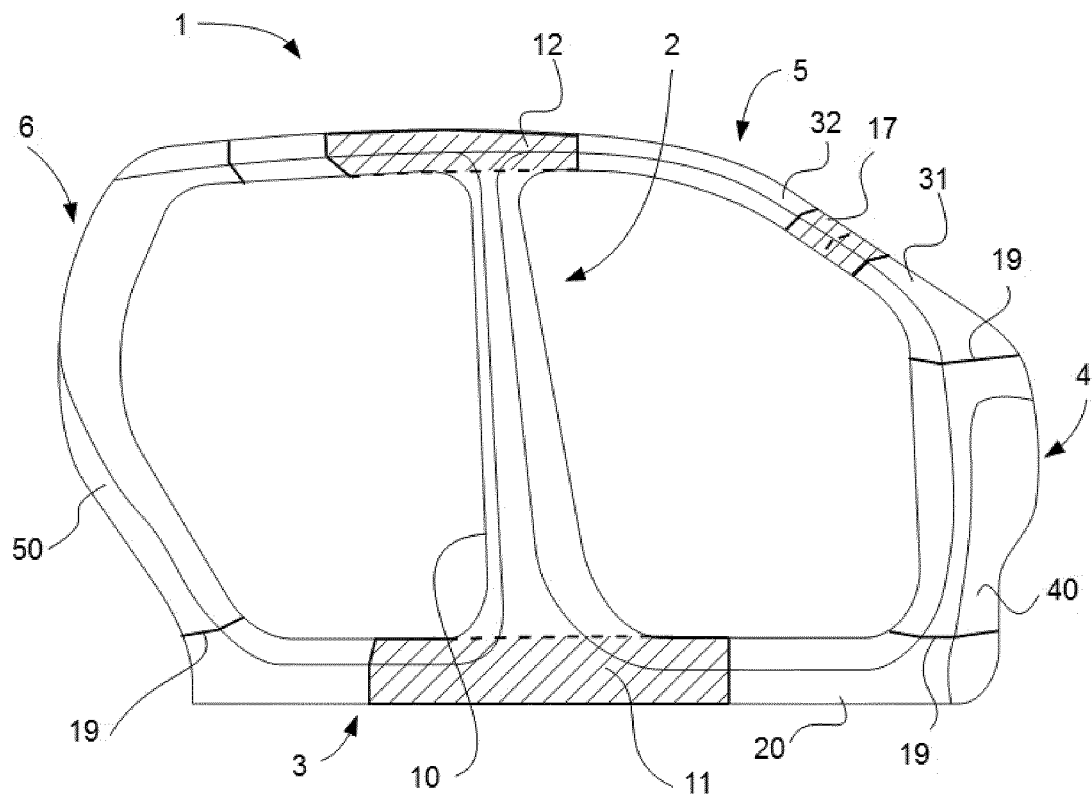
FIG. 11 shows another example of a unitary body side structural frame of a vehicle.

FIG. 11 shows another example of a unitary body side structural frame 1 of a vehicle, similar to the unitary body side structural frame comprising a B-pillar portion 2. In this example, blanks including the B-pillar portion are joined to the other blanks before being deformed, e.g. hot formed. The B-pillar portion 2 may be arranged between the hinge pillar 4 and the C-pillar portion 6 and may extend from the rocker portion 3 to the A-pillar portion 5.

In addition to the A-pillar overlapping region 17 as in FIG. 10, the unitary body side structural frame 1 may additionally comprise a B-pillar-rocker overlapping region 11 and an A-pillar-B-pillar overlapping region 12.

The unitary body side structural frame 1 may comprise any combination of the one or more of the overlapping regions described with respect to FIG. 10.

In a yet further aspect, a method for a manufacturing a body side structural frame made from two unitary body side structural frames is provided. The method comprises providing a unitary front body side structural frame according to any of the examples herein disclosed, providing a unitary rear body side structural frame according to any of the examples herein disclosed and the joining the front and the rear body side structural frame along the B-pillar portion to form a body side structural frame. The resulting structural frame is therefore a "non-unitary" body side structural frame.

For reasons of completeness, various aspects of the present disclosure are set out in the following numbered clauses:

Clause 1. A method for manufacturing a unitary body side structural frame of a vehicle comprising:
providing a plurality of blanks;
joining the blanks to each other to form a composite blank, wherein joining the blanks includes forming one or more overlapping regions formed by partially overlapping two blanks;
deforming the composite blank to form the unitary body side structural frame;
wherein the unitary body side structural frame includes a lower beam portion and an upper beam portion, a front pillar portion connecting the lower beam portion to the upper beam portion, and a rear pillar portion connecting the lower beam portion to the upper beam portion.

Clause 2. A method for manufacturing a unitary body side structural frame according to clause 1, wherein joining the blanks to each other comprises welding the blanks to each other in the one or more overlapping regions; and specifically comprises spot welding the blanks in at least one of the overlapping regions.

Clause 3. A method for manufacturing a unitary body side structural frame according to any of clauses 1-2, wherein at least one of the overlapping regions substantially correspond to a transition between a beam portion and a pillar portion.

Clause 4. A method for manufacturing a unitary body side structural frame according to any of clauses 1-3, wherein at least one of the overlapping regions is arranged within a beam portion and/or within a pillar portion.

Clause 5. A method for manufacturing a unitary body side structural frame according to any of clauses 1-4, wherein deforming the composite blank to form the unitary body side structural frame comprises hot forming the composite blank.

Clause 6. A method for manufacturing a unitary body side structural frame according any of clauses 1-5, wherein the plurality of blanks comprises different material and/or thicknesses.

Clause 7. A method for manufacturing a unitary body side structural frame according to any of clauses 1-6, wherein the unitary body side structural frame comprises a portion of an outer frame.

Clause 8. A method for manufacturing a unitary body side structural frame according to clause 7, wherein the unitary body side structural frame is the outer frame.

Clause 9. A method for manufacturing a unitary body side structural frame according to any of clauses 1-7, wherein the unitary body side structural frame comprises a portion of an inner frame.

Clause 10. A method for manufacturing a unitary body side structural frame according to clause 9, wherein the unitary body side structural frame is the inner frame.

Clause 11. A method for manufacturing a unitary body side structural frame according to any of clauses 1-6, wherein the unitary body side structural frame comprises a portion of an outer frame and a portion of an inner frame.

Clause 12. A method for manufacturing a unitary body side structural frame according to any of clauses 1-11, wherein the unitary body side structural frame is a front frame; and wherein
the lower beam portion comprises a rocker portion;
the upper beam portion comprises an A-pillar portion;
the front pillar portion comprises a hinge pillar portion; and
the rear pillar portion comprises a B-pillar portion.

Clause 13. A method for manufacturing a unitary body side structural frame according clause 12, wherein one of the overlapping regions substantially corresponds to a transition between the rocker portion and the B-pillar portion.

Clause 14. A method for manufacturing a unitary body side structural frame according to any of clauses 12-13, wherein one of the overlapping regions substantially corresponds to a transition between the B-pillar portion and the A-pillar portion.

Clause 15. A method for manufacturing a unitary body side structural frame according to any of clauses 12-14, wherein one of the overlapping regions substantially corresponds to a transition between the A-pillar portion and the hinge pillar portion.

Clause 16. A method for manufacturing a unitary body side structural frame according to any of clauses 12-15, wherein one of the overlapping regions substantially corresponds to a transition between the rocker portion and the hinge pillar portion.

Clause 17. A method for manufacturing a unitary body side structural frame according to any of clauses 12-16, wherein one of the overlapping regions is arranged within the A-pillar portion.

Clause 18. A method for manufacturing a unitary body side structural frame according to any of clauses 1-11, wherein the unitary body side structural frame is a rear frame; and wherein
the lower beam portion comprises a rocker portion;
the front pillar portion comprises a B-pillar portion;
the upper beam portion and the rear pillar portion comprise a C-pillar portion extending from the rocker portion to the B-pillar portion.

Clause 19. A method for manufacturing a unitary body side structural frame according clause 18, wherein one of the overlapping regions substantially corresponds to a transition between the rocker portion and the B-pillar portion.

Clause 20. A method for manufacturing a unitary body side structural frame according to any of clauses 18-19, wherein one of overlapping regions substantially corresponds to a transition between the B-pillar portion and the C-pillar portion.

Clause 21. A method for manufacturing a unitary body side structural frame according to any of clauses 18-20, wherein one of the overlapping regions substantially corresponds to a transition between the C-pillar portion and the rocker portion.

Clause 22. A method for manufacturing a unitary body side structural frame according to any of clauses 1-11, wherein
the lower beam portion comprises a rocker portion;
the front pillar portion comprises a hinge pillar portion;
the rear pillar portion comprises a C-pillar portion;
the upper beam portion comprises an A-pillar portion;
wherein the A-pillar portion extends from the hinge pillar portion to the C-pillar portion and the C-pillar portion extends from the rocker portion to the A-pillar portion.

Clause 23. A method for manufacturing a unitary body side structural frame according to clause 22, wherein one of the overlapping regions substantially corresponds to a transition between the A-pillar portion and the hinge pillar portion.

Clause 24. A method for manufacturing a unitary body side structural frame according to any of clauses 22-23, wherein one of the overlapping regions substantially corresponds to a transition between the rocker and the C-pillar portion.

Clause 25. A method for manufacturing a unitary body side structural frame according to any of clauses 22-24, wherein one of the overlapping regions substantially corresponds to a transition between the rocker and the hinge pillar portion.

Clause 26. A method for manufacturing a unitary body side structural frame according to any of clauses 22-25, wherein one of the overlapping regions substantially corresponds to a transition between the A-pillar portion and the C-pillar portion.

Clause 27. A method for manufacturing a unitary body side structural frame according to any of clauses 22-26, wherein one of the overlapping regions is arranged within the A-pillar portion.

Clause 28. A method for manufacturing a unitary body side structural frame according to any of clauses 22-27, wherein the unitary body side structural frame further comprises a B-pillar portion arranged between the hinge pillar portion and the C-pillar portion and extending from the rocker portion to the A-pillar portion.

Clause 29. A method for manufacturing a unitary body side structural frame according clause 27, wherein one of the overlapping regions substantially corresponds to a transition between the rocker portion and the B-pillar portion.

Clause 30. A method for manufacturing a unitary body side structural frame according to any of clauses 28-29, wherein one of the overlapping regions substantially corresponds to a transition between the B-pillar portion and the A-pillar portion.

Clause 31. A unitary body side structural frame as obtainable by a method according to any of clauses 1-30.

Clause 32. A unitary body side structural frame according to clause 31, wherein the unitary body side structural frame comprises areas with different tensile strength, and optionally wherein the areas with different tensile strength have a different microstructure.

Clause 33. A method for manufacturing a body side structural frame comprising:
providing a unitary front body side structural frame according to any of clauses 12-17;
providing a unitary rear body side structural frame according to any of clauses 18-21;
joining the front and the rear body side structural frame along the B-pillar portion to form a body side structural frame.

Clause 34. A method for manufacturing a body side structural frame comprising:
providing a unitary body side structural frame according to any of clauses 22-27;
providing a B-pillar;
joining the B-pillar to the unitary body side structural frame.

Clause 35. A method for manufacturing a body side structural frame comprising:
providing an outer unitary body side structural frame according to clause 8;
providing an inner unitary body side structural frame according to clause 10;
joining the outer and the inner frames to each other to form a body side structural frame.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for manufacturing a unitary body side structural frame of a vehicle comprising:
providing a plurality of blanks;
joining the blanks to each other to form a composite blank, wherein joining the blanks includes forming one or more overlapping regions formed by partially overlapping two blanks;
deforming the composite blank to form the unitary body side structural frame; wherein the unitary body side structural frame includes:
a lower beam portion comprising a rocker portion;
an upper beam portion;
a front pillar portion connecting the lower beam portion to the upper beam portion; and
a rear pillar portion connecting the lower beam portion to the upper beam portion, and
wherein one of the overlapping regions is included in the rocker portion and corresponds to a transition of the rocker portion to a B-pillar portion, and
wherein the unitary body side structural frame is configured to be attached to a lower flange of an inner or an outer plate of a rocker such that a gap is provided between the transition of the rocker portion to the B-pillar portion and an upper flange of the inner or the outer plate.

2. The method for manufacturing a unitary body side structural frame according to claim 1, wherein joining the blanks to each other comprises welding the blanks to each other in the one or more overlapping regions.

3. The method for manufacturing a unitary body side structural frame according to claim 1, wherein the unitary body side structural frame is a front frame; and wherein
the upper beam portion comprises an A-pillar portion;
the front pillar portion comprises a hinge pillar portion; and
the rear pillar portion comprises a B-pillar portion.

4. The method for manufacturing a unitary body side structural frame according to claim 3, wherein one of the overlapping regions substantially corresponds to a transition between the B-pillar portion and the A-pillar portion.

5. The method for manufacturing a unitary body side structural frame according to claim 3, wherein one of the overlapping regions substantially corresponds to a transition between the A-pillar portion and the hinge pillar portion.

6. The method for manufacturing a unitary body side structural frame according to claim 1, wherein one of the overlapping regions substantially corresponds to a transition between the rocker portion and the hinge pillar portion.

7. The method for manufacturing a unitary body side structural frame according to claim 1, wherein deforming the composite blank to form the unitary body side structural frame comprises hot forming the composite blank.

8. The method for manufacturing a unitary body side structural frame according to claim 1, wherein the plurality of blanks comprises different materials and/or different thicknesses.

9. The unitary body side structural frame as obtainable by a method according to claim 1.

10. The unitary body side structural frame according to claim 9, wherein the unitary body side structural frame comprises areas with different tensile strength.

11. The unitary body side structural frame according to claim 10, wherein the areas with different tensile strength have a different microstructure.

12. The unitary body side structural frame according to claim 9, wherein:
the unitary body side structural frame is a rear frame,
the front pillar portion comprises a B-pillar portion, and
the upper beam portion and the rear pillar portion comprise a C-pillar portion extending from the rocker portion to the B-pillar portion.

13. The unitary body side structural frame according to claim 9, wherein:
the front pillar portion comprises a hinge pillar portion,
the rear pillar portion comprises a C-pillar portion,
the upper beam portion comprises an A-pillar portion, and
the A-pillar portion extends from the hinge pillar portion to the C-pillar portion and the C-pillar portion extends from the rocker portion to the A-pillar portion.

14. The method according to claim 1, wherein the unitary body side structural frame is an outer frame, and the method further comprises joining the outer frame to a structure of the vehicle.

15. The method according to claim 14, wherein the structure of the vehicle is an inner frame.

16. The method according to claim 15, wherein the inner frame is manufactured by the method of claim 1.

17. A method for manufacturing a unitary body side structural frame of a vehicle, the method comprising:
providing a plurality of blanks;
joining the blanks to each other to form a composite blank, wherein joining the blanks includes forming one or more overlapping regions formed by partially overlapping two blanks;
deforming the composite blank to form the unitary body side structural frame; wherein the unitary body side structural frame includes:
a lower beam portion comprising a rocker portion;
an upper beam portion;
a front pillar portion connecting the lower beam portion to the upper beam portion; and
a rear pillar portion connecting the lower beam portion to the upper beam portion, and
wherein one of the overlapping regions is included in the rocker portion and corresponds to a transition of the rocker portion to a hinge pillar portion, and
wherein the unitary body side structural frame is configured to be attached to a lower flange of an inner or outer plate of a rocker such that a gap is provided between the transition of the rocker portion to the B-pillar portion and an upper flange of the inner or the outer plate.

18. The method according to claim 17, wherein joining the blanks to each other to form a composite blank comprises spot welding the blanks.

19. The method according to claim 17, wherein one of the overlapping regions corresponds to a transition between the rocker portion and a B-pillar portion.

* * * * *